(12) United States Patent
Zeng

(10) Patent No.: US 9,828,480 B2
(45) Date of Patent: Nov. 28, 2017

(54) HIGH FILLING AND HIGH RESILIENCE SOFT FOAMING POLYETHYLENE MATERIAL AND PREPARATION METHOD THEREOF

(71) Applicant: MBS ENVIRONMENTAL TECHNOLOGY CO., LTD, Guangdong (CN)

(72) Inventor: Cong Zeng, Guangzhou (CN)

(73) Assignee: MBS ENVIRONMENTAL TECHNOLOGY CO., LTD, Guangzhou (CN)

(*) Notice: Subject to any disclaimer, the term of this patent is extended or adjusted under 35 U.S.C. 154(b) by 96 days.

(21) Appl. No.: 14/770,825

(22) PCT Filed: Dec. 28, 2014

(86) PCT No.: PCT/CN2014/095237
§ 371 (c)(1),
(2) Date: Aug. 27, 2015

(87) PCT Pub. No.: WO2015/101242
PCT Pub. Date: Jul. 9, 2015

(65) Prior Publication Data
US 2016/0009885 A1     Jan. 14, 2016

(30) Foreign Application Priority Data
Dec. 30, 2013 (CN) .......................... 2013 1 0746830

(51) Int. Cl.
C08J 9/00 (2006.01)
C08L 23/06 (2006.01)
C08L 53/02 (2006.01)
C08J 9/10 (2006.01)
C08J 9/32 (2006.01)

(52) U.S. Cl.
CPC ............. *C08J 9/0061* (2013.01); *C08J 9/009* (2013.01); *C08J 9/0066* (2013.01); *C08J 9/103* (2013.01); *C08J 9/32* (2013.01); *C08L 23/06* (2013.01); *C08L 53/025* (2013.01); C08J 2201/026 (2013.01); C08J 2203/04 (2013.01); C08J 2203/184 (2013.01); C08J 2203/22 (2013.01); C08J 2323/06 (2013.01); C08J 2323/08 (2013.01); C08J 2400/22 (2013.01); C08J 2400/26 (2013.01); C08J 2409/06 (2013.01); C08J 2423/08 (2013.01); C08J 2423/16 (2013.01); *C08J 2431/04* (2013.01); *C08J 2453/02* (2013.01)

(58) Field of Classification Search
CPC ............... C08J 9/103; C08J 2323/04–2323/08
See application file for complete search history.

(56) References Cited

U.S. PATENT DOCUMENTS

| 4,021,380 A * | 5/1977 | Nuttall ................... C08J 9/0066 264/54 |
| 2008/0138593 A1* | 6/2008 | Martinez ................ C08J 9/0061 428/220 |
| 2009/0108485 A1 | 4/2009 | Abe et al. |
| 2010/0204349 A1* | 8/2010 | Inohara .................... B01J 13/14 521/56 |

FOREIGN PATENT DOCUMENTS

| CN | 102085736 A | 6/2011 |
| CN | 102218879 A | 10/2011 |
| CN | 103408823 A | 11/2013 |
| EP | 2441794 A2 | 4/2012 |
| JP | 2002226618 A | 8/2002 |

OTHER PUBLICATIONS

Machine translation of CN 102924781 by Li et al.*
Rodriguez-Perez, M.A.; Duijsens, A.; de Saja, J.A. Effect of Addition of EVA on the Technical Properties of Extruded Foam Profiles of Low-Density Polyethylene/EVA blends. J app poly sci 1998 pp. 1237-1244.*

* cited by examiner

*Primary Examiner* — Mike M Dollinger
*Assistant Examiner* — Christina Wales
(74) *Attorney, Agent, or Firm* — Gokalp Bayramoglu

(57) ABSTRACT

Disclosed is a high filling and high resilience soft foaming polyethylene material, comprising the following parts of raw materials by weight: 15-20 parts polyethylene, 5-20 parts elastomers, 60-80 parts modified calcium carbonate, 1-10 parts chemical foaming agent, 0.5-1.5 parts crosslinking agent and 1-5 parts physical foaming agent. Also disclosed is a method of preparing high filling and high resilience soft foaming polyethylene material. The present invention can prepare a high calcium carbonate filling and high resilience soft foaming polyethylene material with calcium carbonate filler content as high as 55-75%, improving rigidity, hardness and compressive strength of the material while maintaining the elasticity of the foaming material, and reducing material density. The present invention has a simple process, greatly reduces costs and is economical and practical.

5 Claims, No Drawings

HIGH FILLING AND HIGH RESILIENCE SOFT FOAMING POLYETHYLENE MATERIAL AND PREPARATION METHOD THEREOF

TECHNICAL FIELD OF THE INVENTION

This invention refers to a polyethylene material, in particular to a high filling and high resilience soft foaming polyethylene material and a method for making the same.

BACKGROUND

Foaming polyethylene material is widely used as foaming material because of its smooth surface, excellent impact absorption, excellent buffer shock absorption and resilience, high tensile strength, excellent chemical stability, excellent environment aging resistance and weather fastness, electrical insulation, thermal insulation and low cost. However, polyethylene material still has defects like low bending strength and compression strength, poor heat resistance, low rigidity and hardness. Thus, inorganic materials are added during material forming processes, on the one hand, improving the rigidity, hardness and other mechanical properties of the polyethylene material, on the other hand, reducing the cost. However, the properties of obtained products are still undesirable.

SUMMARY OF THE INVENTION

One objective of this invention is to provide a high filling and high resilience soft foaming polyethylene material with high rigidity, hardness and compression strength and low cost.

Another objective of this invention is to provide method for preparing a high filling and high resilience soft foaming polyethylene material.

For objectives stated above, the present invention provides the following technical proposal: a high filling and high resilience soft foaming polyethylene material, comprises following parts of raw materials by mass fraction:

15-20 parts of polyethylene, 5-20 parts of elastomers, 60-80 parts of modified calcium carbonate, 1-10 parts of chemical foaming agent, 0.5-1.5 of parts crosslinking agent and 1-5 parts of physical foaming agent.

The polyethylene can be low density polyethylene (LDPE), high density polyethylene (HDPE), linear low density polyethylene (LLDPE), or the combination thereof.

The elastomer can be polymer elastomer (POE), Ethylene Vinyl Acetate Copolymer (EVA), Styrene-Ethylene-Butylene-Styrene (SEBS), Styrene-Butadiene-Styrene (SBS), Ethylene Propylene Diene Monomer (EPDM), ethylene propylene rubber (EPR), or the combination thereof.

The modified calcium carbonate can be calcium carbonate modified by coupling agent.

The method for modifying the calcium carbonate by coupling agent comprises following steps:
(1) drying calcium carbonate with a mesh number greater than or equal to 500 until the water content is lower than or equal to 0.1 wt %;
(2) adding the calcium carbonate obtained in step (1) and the coupling agent into a high speed stirring mixer with a weight ratio of 100:0.5-3, and mixing for 5-20 minutes.

The coupling agent can be titanate coupling agent, silicane coupling agent, aluminium zirconium coupling agent or combination thereof.

The mesh number of the modified calcium carbonate is greater than or equal to 500.

The chemical foaming agent is obtained by mixing azodicarbonamide, zinc oxide and zinc stearate with a weight ratio of 1:(1-1.5):(0.15-2).

The crosslinking agent can be dicumyl peroxide or 2,5-Dimethyl-2,5-di(tert-butylperoxy) hexane.

The physical foaming agent can be swelling microspheres foaming agent which is a new special foaming agent produced by Matsumoto company. The swelling microspheres foaming agent are milk white microballon plastic particles with the diameter of 10-30 um. When the swelling microspheres foaming agent is heated to a certain temperature, the thermoplastic shell of the swelling microspheres becomes soft and the gas in the shell expends. The volume of the physical foaming agent becomes dozens times larger than before, meanwhile, the core-shell structure is not destroyed, which achieves the effects of foaming.

A method for making the high filling and high resilience soft foaming polyethylene material, comprises the following steps:
(1) drying the modified calcium carbonate until the water content is lower than or equal to 0.1 wt %;
(2) placing the polyethylene and the elastomers into an open mill and plasticating at a temperature of 110-120° C. for 2-5 minutes;
(3) adding modified calcium carbonate, physical foaming agent, chemical foaming agent and crosslinking agent into the open mill in sequence, and mixing and plasticating at a temperature of 120-130° C. for 10-15 minutes;
(4) putting the mixed material into a module, and putting the module into a press vulcanizer to foam at a temperature of 160-180° C., under 5-15 MPa and for 5-15 minutes, opening the module, taking the material out and forming under a light pressure to obtain the polyethylene foaming material; or putting the module into a press vulcanizer to foam at a temperature of 145-165° C., under 5-15 MPa for 3-10 minutes, demolding after being cooled down to room temperature, and foaming for a second time at a temperature of 170-180° C. for 5-10 minutes to obtain the polyethylene foaming material.

Compared with existing technology, the present invention has following advantages: the obtained high filling and high resilience soft foaming polyethylene material can obtain a calcium carbonate filling content of 55-75 wt %. Moreover, on the basis of keeping the elasticity of foaming material, the rigidity, hardness and compressive strength is improved, and the density is reduced at the same time. The production process is simply and low cost.

DETAIL DESCRIPTION OF THE INVENTION

The embodiments of the invention is described below to give a detail description of the invention.

Embodiment 1

A high filling high resilient soft foaming polyethylene material, comprises following parts of raw materials by mass fraction:

16 parts of polyethylene, 6 parts of elastomers, 61 parts of modified calcium carbonate, 2 parts of chemical foaming agent, 0.6 parts of crosslinking agent and 2 parts of physical foaming agent.

Embodiment 2

A high filling high resilient soft foaming polyethylene material, comprises following parts of raw materials by mass fraction:

19 parts of polyethylene, 19 parts of elastomers, 79 parts of modified calcium carbonate, 9 parts of chemical foaming agent, 1.4 parts of crosslinking agent and 4 parts of physical foaming agent.

Embodiment 3

A high filling high resilient soft foaming polyethylene material, comprises following parts of raw materials by mass fraction:

15 parts of polyethylene, 13 parts of elastomers, 71 parts of modified calcium carbonate, 6 parts of chemical foaming agent, 1.1 of parts crosslinking agent and 3 parts of physical foaming agent.

The polyethylene is can be low density polyethylene (LDPE), high density polyethylene (HDPE), linear low density polyethylene (LLDPE), or a mixture of LDPE, HDPE and LLPPE with weight ratio of 1:(0-0.1):(0.5-2).

The elastomer can be POE, EVA, SEBS, SBS, EPDM, EPR or combination thereof.

The modified calcium carbonate is calcium carbonate modified by coupling agent with a mesh number greater than or equal to 500.

The chemical foaming agent is prepared by mixing azodicarbonamide, zinc oxide and zinc stearate with a weight ratio of 1:(1-1.5):(0.15-2). Preferably, the chemical foaming agent is prepared by mixing azodicarbonamide, zinc oxide and zinc stearate with a weight ratio of 1:1.3:1.5. This weight ratio makes the mixture foam rapidly and stably at a temperature of 160-180° C. The crosslinking agent can be dicumyl peroxide or 2,5-Dimethyl-2,5-di(tert-butylperoxy) hexan. The physical foaming agent is swelling microspheres foaming agent. Preferably, Matsumoto company MSH-500 swelling microspheres foaming agent is used. The swelling microspheres foaming agent are milk white microballon plastic particles with the diameter of 10-30 um. When the swelling microspheres foaming agent is heated to a certain temperature, the thermoplastic shell of the swelling microspheres foaming agent becomes soft and the gas in the shell expends. The volume of the physical foaming agent becomes dozens times larger than before, meanwhile, the core-shell structure is not destroyed, which achieves the effects of foaming.

A method for making the high filling and high resilience soft foaming polyethylene material stated above, comprises the following steps:
(1) drying the modified calcium carbonate until the water content is lower than or equal to 0.1 wt %;
(2) putting the polyethylene and the elastomers into an open mill and plasticating at a temperature of 110-120° C. for 2-5 minutes;
(3) adding modified calcium carbonate, physical foaming agent, chemical foaming agent and crosslinking agent into the open mill in sequence, and mixing and plasticating at a temperature 120-130° C. for 10-15 minutes;
(4) putting the mixed material into a module, and putting the module into a press vulcanizer to foam at a temperature of 160-180° C., under 5-15 MPa and for 5-15 minutes, opening the module, taking the material out and forming under a light pressure to obtain the polyethylene foaming material; or putting the mixed material into a module, putting the module into a press vulcanizer to foam at a third temperature of 145-165° C., under 5-15 MPa for 3-10 minutes, demolding after being cooled down to room temperature, and foaming for second time at a fourth temperature of 170-180° C. for 5-10 minutes to prepare the polyethylene foaming material.

Preferably, the method for preparing a high filling and high resilience soft foaming polyethylene material stated above, comprises the following steps:
(1) drying the modified calcium carbonate until the water content is lower than or equal to 0.1 wt %;
(2) putting the polyethylene and the elastomers into an open mill and plasticating at a temperature of 115-120° C. for 4 minutes;
(3) adding modified calcium carbonate, physical foaming agent, chemical foaming agent and crosslinking agent into the open mill in sequence, and mixing and plasticating at a temperature 125° C. for 13 minutes;
(4) putting the mixed material into a module, and putting the module into a press vulcanizer to foam at a temperature of 170° C., under 10 MPa and for 10 minutes, opening the module, taking the material out and forming under a light pressure to obtain the polyethylene foaming material; or putting the module into a press vulcanizer to foam at a temperature of 155° C., under 10 MPa for 7 minutes, demolding after being cooled down to room temperature, and foaming for second time at a temperature of 175° C. for 8 minutes to prepare the polyethylene foaming material.

Embodiment 4

First, uniformly mixing 50 g LDPE and 50 g POE, and then adding into a two roll open mill; plasticating at a temperature of 115° C. for 3 minutes; adding 200 g titanate coupling agent modified calcium carbonate with mesh number of 500 (the type of the titanate coupling agent is AT2-TMC-311w), 5 g physical foaming agent, 6 g azodicarbonamide, 4 g zinc oxide, 1 g zinc stearate and 0.5 g dicumyl peroxide into the two roll open mill, mixing and plasticating at a temperature of 130° C. for 15 minutes; putting the mixed material into a module, putting the module into a press vulcanizer to foam at a temperature of 165° C., under 10 MPa and for 10 minutes, opening the module, taking the material out, forming under a light pressure and cooling to obtain the polyethylene foaming material.

The above description is preferred embodiments of this invention. Various modifications to these embodiments are obvious to the person skilled in the art. The general principle defined therein may be implemented in other embodiments without departing from the spirit and scope of the application. Thus, the application is not limited to these embodiments illustrated herein, but conforms to a broadest scope consistent with the principle and novel features disclosed herein.

The invention claimed is:
1. A high filling high resilient soft foaming polyethylene material, comprising following parts of raw materials by mass fraction: 15-20 parts of polyethylene, 5-20 parts of elastomers, 60-80 parts of modified calcium carbonate, 1-10 parts of chemical foaming agent, 0.5-1.5 parts of crosslinking agent and 1-5 parts of physical foaming agent; wherein the chemical foaming agent is prepared by mixing azodicarbonamide, zinc oxide and zinc stearate with a weight ratio of 1:(1-1.5):(0.15-2);
wherein the elastomer is selected from the group consisting of polyolefin elastomer (POE). Styrene-Ethylene-Butylene-Stvrene (SEBS), Styrene-Butadiene-Styrene (SBS), Ethylene Propylene Diene Monomer (EPDM), ethylene propylene rubber (EPR) and a combination thereof;
wherein the polyethylene is a mixture of LDPE, HDPE and LLDPE with weight ratio of 1:(0-0.1):(0.5-2).

2. The material of claim 1, wherein the modified calcium carbonate is calcium carbonate modified by a coupling agent, the mesh number of modified calcium carbonate is greater than or equal to 500.

3. The material of claim 1, wherein the crosslinking agent is dicumyl peroxide or 2,5-Dimethyl-2,5-di(tert-butylperoxy) hexane.

4. The material of claim 1, wherein the physical foaming agent is swelling microspheres foaming agent.

5. A method for preparing the high filling and high resilience soft foaming polyethylene material of claim 1, comprising:

drying the modified calcium carbonate until the water content is lower than or equal to 0.1 wt %;

putting the polyethylene and the elastomers into an open mill and plasticating at a temperature of 110-120° C. for 2-5 minutes;

adding modified calcium carbonate, physical foaming agent, chemical foaming agent and crosslinking agent into the open mill in sequence, and mixing and plasticating at a temperature of 120-130° C. for 10-15 minutes;

putting the mixed material into a module, and putting the module into a press vulcanizer to foam at a temperature of 160-180° C., under 5-15 MPa for 5-15 minutes, opening the module, taking the material out and forming under a light pressure to obtain the polyethylene foaming material; or putting the module into a press vulcanizer to foam at a temperature of 145-165° C., under 5-15 MPa for 3-10 minutes, demolding after being cooled down to room temperature, and foaming for a second time at a temperature of 170-180° C. for 5-10 minutes to prepare the polyethylene foaming material.

* * * * *